(12) United States Patent
Miloseski et al.

(10) Patent No.: US 10,194,195 B2
(45) Date of Patent: *Jan. 29, 2019

(54) SYSTEMS AND METHODS FOR PRESENTING HOME SCREEN SHORTCUTS

(71) Applicant: GOOGLE LLC, Mountain View, CA (US)

(72) Inventors: Dennis Miloseski, Danville, CA (US); Justin Koh, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,410

(22) Filed: Apr. 27, 2016

(65) Prior Publication Data

US 2016/0261907 A1    Sep. 8, 2016

Related U.S. Application Data

(63) Continuation of application No. 13/556,065, filed on Jul. 23, 2012, now Pat. No. 9,338,510.
(Continued)

(51) Int. Cl.
*H04N 21/431* (2011.01)
*H04N 21/47* (2011.01)
(Continued)

(52) U.S. Cl.
CPC ..... *H04N 21/4312* (2013.01); *H04N 21/4122* (2013.01); *H04N 21/4622* (2013.01); *H04N 21/47* (2013.01); *H04N 21/8586* (2013.01)

(58) Field of Classification Search
CPC .................................................. H04N 5/4401
(Continued)

(56) References Cited

U.S. PATENT DOCUMENTS 8,209,723 B2    6/2012   Sakaguchi et al.
8,594,714 B2    11/2013  Wu
(Continued)

OTHER PUBLICATIONS

Google Inc., International Preliminary Report on Patentability, PCT/US2012/048118, dated Feb. 4, 2014, 5 pgs.
(Continued)

*Primary Examiner* — Jefferey F Harold
*Assistant Examiner* — Sihar A Karwan
(74) *Attorney, Agent, or Firm* — Morgan, Lewis & Bockius LLP (57) ABSTRACT

A method for presenting home screen shortcuts is disclosed. The method includes receiving a selection of shortcuts to a plurality of applications of at least two different types available for execution on a television device and presenting those shortcuts on a home screen user interface displayed on a TV screen or a second screen device. The method also includes responding to a user selection of one of the shortcuts by causing execution of the application associated with the shortcut, including in response to selection of the TV channel shortcut, executing a set of actions are executed in association with the selected TV channel shortcut. The set of actions at least includes a first action to launch a TV player application associated with the TV channel shortcut and a second action of tuning to the TV channel corresponding to the TV channel shortcut.

20 Claims, 5 Drawing Sheets

Related U.S. Application Data (60) Provisional application No. 61/513,633, filed on Jul. 31, 2011.

(51) Int. Cl.
*H04N 21/41* (2011.01)
*H04N 21/462* (2011.01)
*H04N 21/858* (2011.01)

(58) Field of Classification Search
USPC .......................... 455/557; 536/231; 348/552
See application file for complete search history.

(56) References Cited

U.S. PATENT DOCUMENTS

| | | |
|---|---|---|
| 2006/0064716 A1 | 3/2006 | Sull |
| 2007/0061724 A1 | 3/2007 | Slothouber et al. |
| 2007/0250896 A1 | 10/2007 | Parker et al. |
| 2008/0136940 A1 | 6/2008 | Srikanth |
| 2009/0100361 A1 | 4/2009 | Abello et al. |
| 2010/0011320 A1 | 1/2010 | Shah et al. |
| 2010/0212023 A1 | 8/2010 | Asahara |
| 2010/0222102 A1* | 9/2010 | Rodriguez ............ G06Q 30/02 455/557 |
| 2011/0080608 A1 | 4/2011 | Do et al. |
| 2011/0158125 A1 | 6/2011 | Haaparanta |
| 2012/0026397 A1 | 2/2012 | Gummagatta |

OTHER PUBLICATIONS

Google Inc., International Search Report and Written Opinion, PCT/US2012/048118, dated Dec. 20, 2012, 7 pgs.

Google Inc., Supplementary European Search Report, EP Patent Application 12820426.0, dated Feb. 27, 2015, 6 pgs.

Google, Notification of First Office Action, CN Application No. 201280047408.3, dated Sep. 2, 2016, 7 pgs.

* cited by examiner

SYSTEMS AND METHODS FOR PRESENTING HOME SCREEN SHORTCUTS

RELATED APPLICATION

This application is a continuation of U.S. patent application Ser. No. 13/556,065, filed Jul. 23, 2012, entitled "Systems and Methods for Presenting Home Screen Shortcuts," which claims priority to U.S. Provisional Application Ser. No. 61/513,633, filed Jul. 31, 2011, entitled "Systems and Methods for Presenting Home Screen Shortcuts." Content of each of the above applications is incorporated by reference herein in its entirety.

TECHNICAL FIELD

The disclosed embodiments relate generally to presenting on a TV screen home screen shortcuts that represent content applications for TV. More particularly, the disclosed embodiments relate to methods and systems for presenting on a TV screen home screen shortcuts for different types of applications that execute on an Internet-enabled TV or TV companion device, such as a set top box.

BACKGROUND

In the past, television devices (e.g., televisions and receivers/set top boxes coupled to televisions) were used to access only television programming. Increasingly, television devices are connected to the Internet and have processing capabilities that permit the devices to execute computer applications, access digital content via Internet-streaming services, and display Web pages on television screens in addition to television programming. Also, because users typically sit further from television screens than computer screens and interact with television devices using a remote control and/or a device with a directional pad, it can be challenging for users to interact with the wide range of viewing choices and applications available on television devices. Also, while it may be acceptable for users of computers or personal devices (such as smart phones) to select content from a variety of menus/folders (e.g., accessing a bookmarks menu to select web pages and an applications menu to select programs), this is not convenient for TV viewers given limits on the available user interfaces and the fact that viewers want to access content for viewing in as direct a manner as possible (e.g., without selecting from particular menus).

SUMMARY

A number of embodiments (e.g., of computer systems or devices, and methods of operating such systems or devices) that overcome the limitations and disadvantages described above are presented in more detail below. These embodiments provide methods, systems, and graphical user interfaces (GUIs) for providing a unified user interface that provides shortcuts to TV applications of disparate application types, all of which are configured to execute on a TV device (as defined in this patent application) associated with the computer system. For example, the different TV application types can include two or more of applications, web pages, email, games, TV channels and widgets.

As described in more detail below, some embodiments involve a method for providing home screen short cuts to TV applications available for execution on a TV device. The method is performed at a computer system coupled with a television device and a television screen (whether integrated with the television device or not). The computer system includes one or more processors and memory storing multiple computer programs, for execution by the one or more processors, for displaying content on the television device. The method includes: receiving a plurality of shortcuts associated with TV applications of two or more different application types; displaying on a television screen associated with the television device a unified home screen user interface including the shortcuts, wherein the shortcuts associated with TV applications of different application types are displayed together; and in response to selection of one of the displayed shortcuts, launching the TV application associated with the shortcut, such that a user interface of the launched TV application is displayed on the television screen associated with the television device.

In some embodiments, each of at least a subset of the shortcuts is associated with a intent, in which case the method includes: in response to selection of one of the shortcuts with an associated intent, launching the TV application associated with the shortcut with an application state that reflects the associated intent, such that a user interface of the launched TV application for the application state is displayed on the television screen.

In some embodiments, the method includes: displaying and hiding the home screen user interface under control of the TV control program based on context of the TV control program. In some embodiment, the method includes: displaying the home screen in response to selection by a user of a home screen button on a physical interface device employed by the user to control the television device.

BRIEF DESCRIPTION OF THE DRAWINGS

For a better understanding of the aforementioned embodiments as well as additional aspects and embodiments thereof, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Methods and systems for providing home screen shortcuts for TV applications are described. Reference will be made to certain embodiments, examples of which are illustrated in the accompanying drawings. While the invention will be described in conjunction with the embodiments, it will be understood that the embodiments are not intended to limit the invention to these particular embodiments alone.

Moreover, in the following description, numerous specific details are set forth to provide a thorough understanding of the described embodiments. However, it will be apparent to one of ordinary skill in the art that some embodiments may be practiced without these particular details. In other instances, methods, procedures, components, and networks that are well-known to those of ordinary skill in the art are not described in detail to avoid obscuring aspects of the embodiments described in this document.

Figure 1:
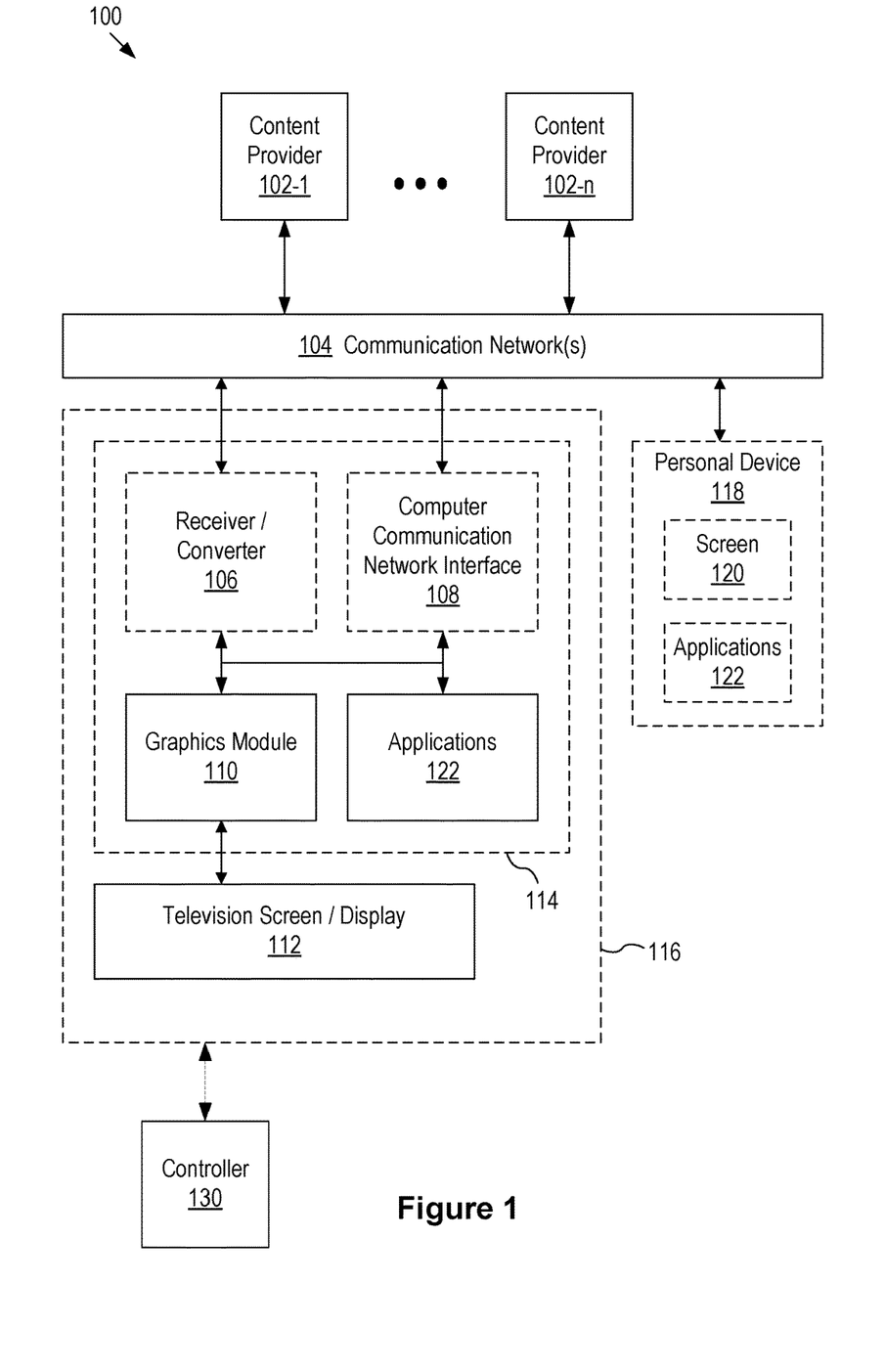
FIG. 1 is a block diagram illustrating an exemplary content distribution system, in accordance with some embodiments.

FIG. 1 is a block diagram illustrating an exemplary content distribution system 100, according to certain embodiments. In FIG. 1, the system 100 includes one or more content providers 102 and communications networks 104. Connected to the communication networks 104 is a companion device 114 coupled with a television screen 112 or an integrated television device 116 that includes the television screen 112 and components of the companion device 114. In some embodiments, the companion device 114 is a set-top box or is a computing device that includes set-top box functionality. Various embodiments of the companion device 114 and/or the integrated television device 116 implement the methods described in this document. In some embodiments, the system 100 includes a controller 130 through which a user can control the devices 114, 116. In some embodiments, the controller 130 includes a "Home" button that, when pressed by a user, causes a home screen user interface 330 (as described with reference to FIG. 3) to be displayed on the television screen 112 or the personal device screen 120.

As used herein, content providers 102 are systems or devices configured to provide media content (e.g., music, television programs, movies, social media data, web data, etc.). The content providers 102 can be any of a number of content provider systems, equipment, and/or devices that provide media content (e.g., radio broadcasting systems, on-air television broadcasting systems, cable service systems, direct satellite broadcasting systems, Internet television service servers, Internet radio station servers, web servers, digital video recorders, etc.). In some embodiments, at least a subset of the media contents distributed by the content providers 102 includes audio data (e.g., music, radio programs, television programs, movies, etc.). In some embodiments, at least a subset of the media contents distributed by the content providers 102 includes video data (e.g., photos, television programs, movies, etc.). In some embodiments, at least a subset of the media contents distributed by the content providers 102 includes multimedia data (e.g., television programs, movies, etc.). In some embodiments, at least a subset of the media contents distributed by the content providers 102 includes user-readable text (e.g., messages sent via short message services, postings on blogs or other social networking media, web pages, etc.).

The content providers 102 distribute media contents via the communication networks 104. The communication networks 104 may include one or more of: radio-frequency communication networks used for on-air or satellite television broadcasting, radio-frequency communication networks used for on-air radio broadcasting, cable-based communication networks, digital audio/video communication networks, the Internet, other wide area networks, local area networks, metropolitan area networks, wireless networks, cellular networks, and so on.

In some embodiments, the companion device 114 or the integrated television device 116 includes a receiver/converter 106 connected to the communication networks 104 and configured to receive audio and/or video signals, typically via one or more of radio-frequency communication networks and/or one or more digital audio/video communication networks.

In some embodiments, the companion device 114 or the integrated television device 116 includes one or more computer communication network interfaces 108 that are configured for interfacing with one or more computer communication networks, such as the Internet, other wide area networks, local area networks, metropolitan area networks, wireless networks, cellular networks, and so on.

The companion device 114 or the integrated television device 116 stores and/or executes television applications 122. The applications 122 include application programs used for managing the companion device 114 or the integrated television device 116, including, in some embodiments, applications for controlling the display on the television screen of media content from one or more of the content providers 102. For example, at least one of the television applications 122 is configured to receive data from the receiver/converter 106 and/or the computer communication network interface 108 and send data and instructions to a graphics module 110 for rendering media and program content, including user interfaces and/or user interface objects. In some embodiments, the television applications include local applications (e.g., a TV Player application or a device settings application), media players (e.g., players of digital media content), web browsers (e.g., for accessing web sites and web-based content services), email applications, TV channels, games and widgets (such as a search widget). Other application types can work equally well within the context of the described technology.

The graphics module 110 includes one or more display processors or graphics processing units for rendering user interfaces and/or user interface objects. In some embodiments, the graphics module 110 receives data from the receiver/converter 106 and/or the computer communication network interface 108, and additional data or instructions from the applications 122 for rendering user interfaces and/or user interface objects. The user interfaces and/or user interface objects rendered by the graphics module 110 are sent to the television screen 112 for display.

The companion device 114 or the integrated television device 116 may include additional components not illustrated in FIG. 1.

Also illustrated in FIG. 1 is a personal device 118. The personal device 118 may be any of a number of computing devices (e.g., Internet kiosk, personal digital assistant, cell phone, smart phone, gaming device, desktop computer, laptop computer, tablet computer, handheld computer, or combinations thereof) used to enable the activities described below. The personal device 118 includes a display screen 112 where a graphical user interface (GUI) can be displayed. In some embodiments, the personal device 118 is also configured to receive media content from the content providers 102 via the communication networks 104, and display the received media content. In some embodiments, the personal device also can server as the controller 130.

In some embodiments, the applications 122 can be executed on either or both a personal device 118 or a companion device 114, in which case the application output, including user interface elements, is presented on either the television screen 112 or the personal device screen 120. For example, an application can be an Android application that can be executed on a companion device 114 (such as a Google TV-enabled set-top box) and a smart phone/personal device 118 (such as an Android phone).

Figure 2:
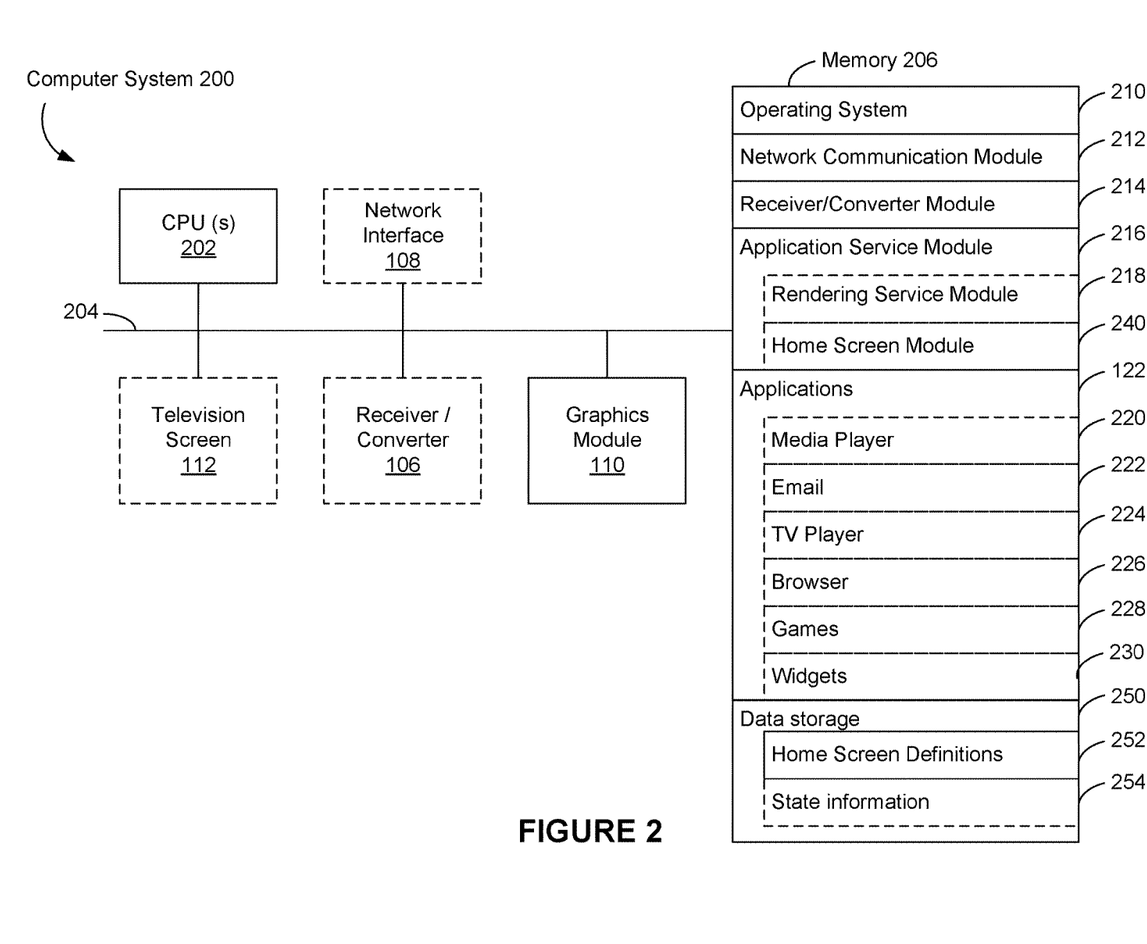
FIG. 2 is a block diagram illustrating a computer system, in accordance with some embodiments.

FIG. 2 is a block diagram illustrating a computer system 200 in accordance with some embodiments. In some embodiments, the computer system 200 corresponds to the companion device 114 or the integrated television device 116 (FIG. 1).

The computer system 200 typically includes one or more processing units (CPUs) 202, graphics module 110, and memory 206. In some embodiments, the computer system 200 also includes one or more of: one or more network or other communications interfaces 108, and one or more receivers and/or converters 106. The computer system 200 includes one or more communication buses 204 for interconnecting these components. In some embodiments, the communication buses 204 include circuitry (sometimes called a chipset) that interconnects and controls communications between system components. In some other embodiments, the computer system 200 includes a user interface (not shown) (e.g., a keyboard, and a mouse or other pointing device). The computer system 200 is coupled with the television screen 112, regardless of whether the television screen 112 is integrated with the computer system 200 or located outside the computer system 200. The television screen 112 may be used to display a graphical user interface.

The memory 206 of the computer system 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a non-transitory computer readable storage medium. In some embodiments, the memory 206 or the computer readable storage medium of the memory 206 stores the following programs, modules and data structures, or a subset thereof:

- operating system 210 that includes procedures for handling various basic system services and for performing hardware dependent tasks;
- network communication module (or instructions) 212 that is used for connecting the computer system 200 to the content providers (e.g., content providers 102, FIG. 1) via one or more network interfaces 108 and one or more communications networks 104 (FIG. 1), such as the Internet, other wide area networks, local area networks, metropolitan area networks, wireless networks, cellular networks, and so on;
- receiver/converter module (or instructions) 214 that is used for receiving media content from the content providers (e.g., content providers 102) via one or more receivers/converters 106 and one or more communications networks 104, such as radio-frequency audio/video communication networks, cable-based communication networks, digital audio/video communication networks, and so on;
- application service module 216 that provides various services to the applications 122;
- applications 122, which include various applications executed by the one or more processing units 202 causing the computer system 200 to perform certain operations (e.g., a media player 220, which, when executed, displays contents of media data; an email application 222, which, when executed, displays one or more email messages, a TV player application 224, which tunes/receives and displays content from the TV inputs to the companion device 114, one or more web browsers 226, games 228, and widgets 230, such as search and text editing widgets.
- data storage 226 that stores various data used by the computer system 200.

The data storage 250 typically includes home screen definitions 252 that provide information related to shortcuts that includes in some embodiments: a type of the shortcut (e.g., whether the shortcut is opened in a browser or the TV player or requires the launching of a local application), a path or URL of the application associated with the shortcut, and any actions needed to carry out an "intent" that is associated with the shortcut. The home screen definitions 252 are described in detail with respect to FIG. 4. The data storage in some embodiments also includes state information 254 that indicates, for example, the status of the devices 114, 116 (e.g., whether the TV or companion device has just been turned on or off), the status of the various applications 122 (e.g., whether the TV Player application has just been launched or closed) and a log of user interactions with the devices 114, 116.

The application service module 216 includes one or more service modules to provide various application services (e.g., memory management, data management, graphics rendering, etc.) to the applications 122. In some embodiments, the application service module 216 is included in the operating system 210. In some embodiments, the application service module 216 includes a home screen module 240 for managing shortcuts (including assignment of shortcuts to the home screen, editing of information related to shortcuts, launching applications associated with shortcuts, storage of data associated with each shortcut—e.g., home screen definitions 252—and displaying and hiding of the home screen user interface). In some embodiments, the home screen module 240 refers to the state information 254 for context related to determining when to display or hide the home screen user interface. In some embodiments, the application service module 216 includes a rendering service module 218 for sending data and/or instructions to the graphics module 110 for rendering user interfaces and/or user interface objects, including the home screen user interface.

Optionally, the memory 206 may include additional applications 122, modules, or components. In some embodiments, the computer system 200 includes additional components not illustrated in FIG. 2. For example, the computer system 200 may include one or more audio modules for generating and/or amplifying audio signals. The computer system 200 may also include one or more security modules for protecting the data stored in the computer system 200.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above.

Notwithstanding the discrete blocks in FIGS. 1 and 2, these figures are intended to provide functional descriptions of some embodiments rather than structural descriptions of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, the television screen 112 is included in the computer system 200. In other embodiments, the television screen 112 is physically separated from the computer system 200. In some embodiments, the CPUs 202 and the memory 206 are included in a single semiconductor package. In some embodiments, the CPUs 202 and the graphics module 110 are included in a single semiconductor package. In some embodiments, the computer system 200 is implemented on multiple distributed computer systems. In some embodiments, the user activity data module 218 is integrated into the application service module 216, and the user activity data module 218 may not exist as a separate module.

The actual number of components used to implement the computer system 200 and how features are allocated among them will vary from one implementation to another, and may depend in part on the amount of data traffic that the system must handle during peak usage periods as well as during average usage periods, and may also depend on the amount of data stored by the computer system 200. Moreover, one or more of the blocks (e.g., the television screen 112, and the receiver/converter 106, etc.) in FIGS. 1 and 2 may be implemented on one or more separate devices designed to provide the described functionality. Although the description herein refers to certain features implemented in the television device and the computer system 200, the embodiments are not limited to such distinctions. For example, features described herein as being part of the computer system 200 can be implemented in whole or in part in the television device, and vice versa.

Figure 3:
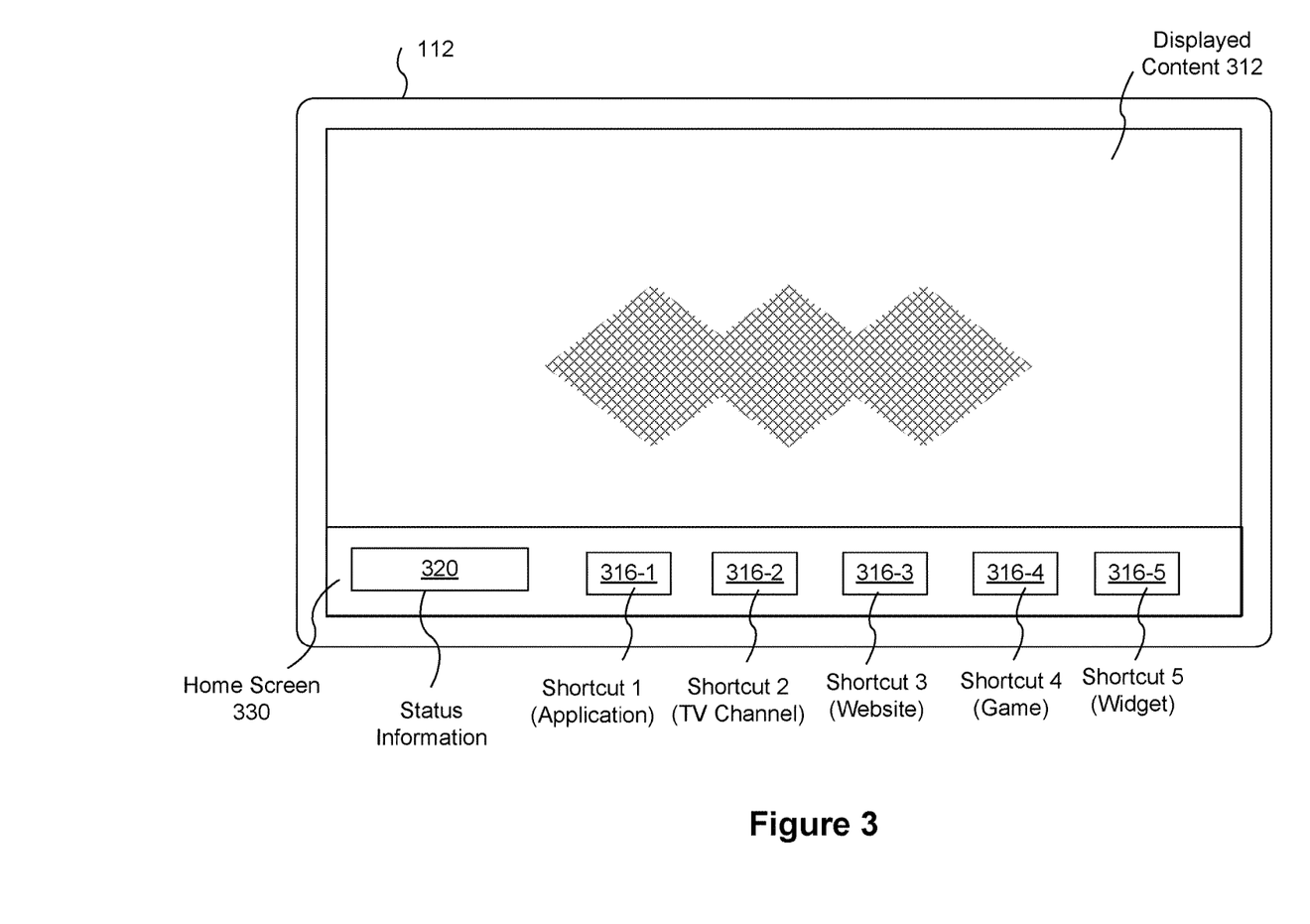
FIG. 3 illustrates an exemplary user interface in accordance with some embodiments.

FIG. 3 illustrates an exemplary user interface displayed on a television screen 112 and/or a personal device 118 (e.g., a mobile phone, a tablet computer, a notebook computer, a desktop computer, etc.) in accordance with some embodiments. As described above, in some embodiments the home screen user interface 330 presents in a unified context a collection of shortcuts 316 to TV applications of different types. In some embodiments, the home screen 330 is displayed in response to a user pressing a "home" button on the controller 130. In some embodiments, the home screen 330 is displayed based on contextual information for the system. For example, in some embodiments the home screen 330 is displayed (or hidden) when it is determined (e.g., by the home screen module 240) based on state information 254 that it is appropriate to display (or hide) the home screen user interface 330 (e.g., the home screen is displayed when the TV Player or other media application is launched and hidden once a user has selected a shortcut 316).

In the exemplary configuration shown in FIG. 3, the home screen 330 is shown as a horizontal overlay across the bottom of displayed content 312, which can be any type of content displayed on the television screen 112. The home screen 330 in this example includes shortcuts 316 of five different types: a shortcut 316-1 to the TV player application, a shortcut 316-2 to a TV channel (e.g., "NBC" or "ABC"), a shortcut 316-3 to a web site (e.g., "YouTube" or the "New York Times"), a shortcut 316-4 to game application (e.g., "Angry Birds") and a shortcut 316-5 to a widget (e.g., a "Search" widget). Selection by a user of a shortcut 316 results in the transparent (to the user) execution/launching of the associated application in one or more operations/actions. The actions to launch an application in response to selection of shortcut can be different based on the type of the associated TV application. In some embodiments, the one or more operations are defined so as to implement an intent associated with that short cut. For example, in some embodiments, if a user selects a shortcut 316-2 associated with a particular TV channel (e.g., "HBO"), the operations would include launching the TV player application and tuning the TV player application to the "HBO" channel. Similarly, if a user selects a shortcut 316-3 to a web site, the operations would include launching the web browser and directing the browser to the URL associated with that web site. In some embodiments, selection of a shortcut causes the associated application to be launched directly. For example, if a user selects a shortcut 316-1 to a local application (e.g., the TV Player 224), that application is launched directly. Note that there is no limit on the number of shortcuts of a particular type. There can be multiple shortcuts 316 of the same type, or the shortcuts 316 can all be of a different type.

Providing shortcuts of different types on a single user interface in this manner enables the user to conveniently select any type of application to execute/launch using a controller 130. This also frees the user from the need to go to different folders to access shortcuts of a particular type (e.g., going to a bookmarks folder to select bookmarks to web pages and going to an applications folder to select shortcuts to local applications). In some embodiments, the shortcuts presented on the home screen can be selected and assigned by the user from folders of shortcuts, or can be selected and assigned from on search results for particular shortcuts. In some embodiments, the shortcuts 316 include a shortcut to a "Search" widget that, when selected by a user, allows the user to search for other shortcuts 316 that can be assigned to the home screen 330. The computer system 200 (e.g., the home screen module 240) can also suggest shortcuts for inclusion on the home screen based on frequency of use or other usage based criteria of the associated TV applications.

The rendering service module 218 adjusts the user interface displayed on the television screen 112 such that a user interface configured for the television screen 112, instead of a user interface configured for a personal device 118, is displayed. It should be noted that FIG. 3 is not drawn to scale. Also the configuration of the home screen 330 shown in FIG. 3 is exemplary and can be varied—in some embodiments in response to user-selected settings. For example, instead of a horizontally-oriented home screen 330 showing the shortcuts 316 in a single row (as shown in FIG. 3), in some embodiments the home screen 330 can have a vertical orientation showing the shortcuts 316 in a single vertical columns. In some embodiments, there can also be more than one row or column of the shortcuts 316, and the home screen 330 can be displayed in different positions on the screen 112, or as a tile instead of as an overlay on the displayed content 312.

In some embodiments, the home screen 330 is displayed on the display 120 of the personal device 118. In such a configuration, the personal device 118 can be used as a second screen device to control the display of content 312 on the television screen 112. For example, in such a configuration selection by a user of a shortcut 316 from the screen of the personal device screen 120 results in launching of an associated TV application 122 stored on the devices 114 or 116.

Figure 4:
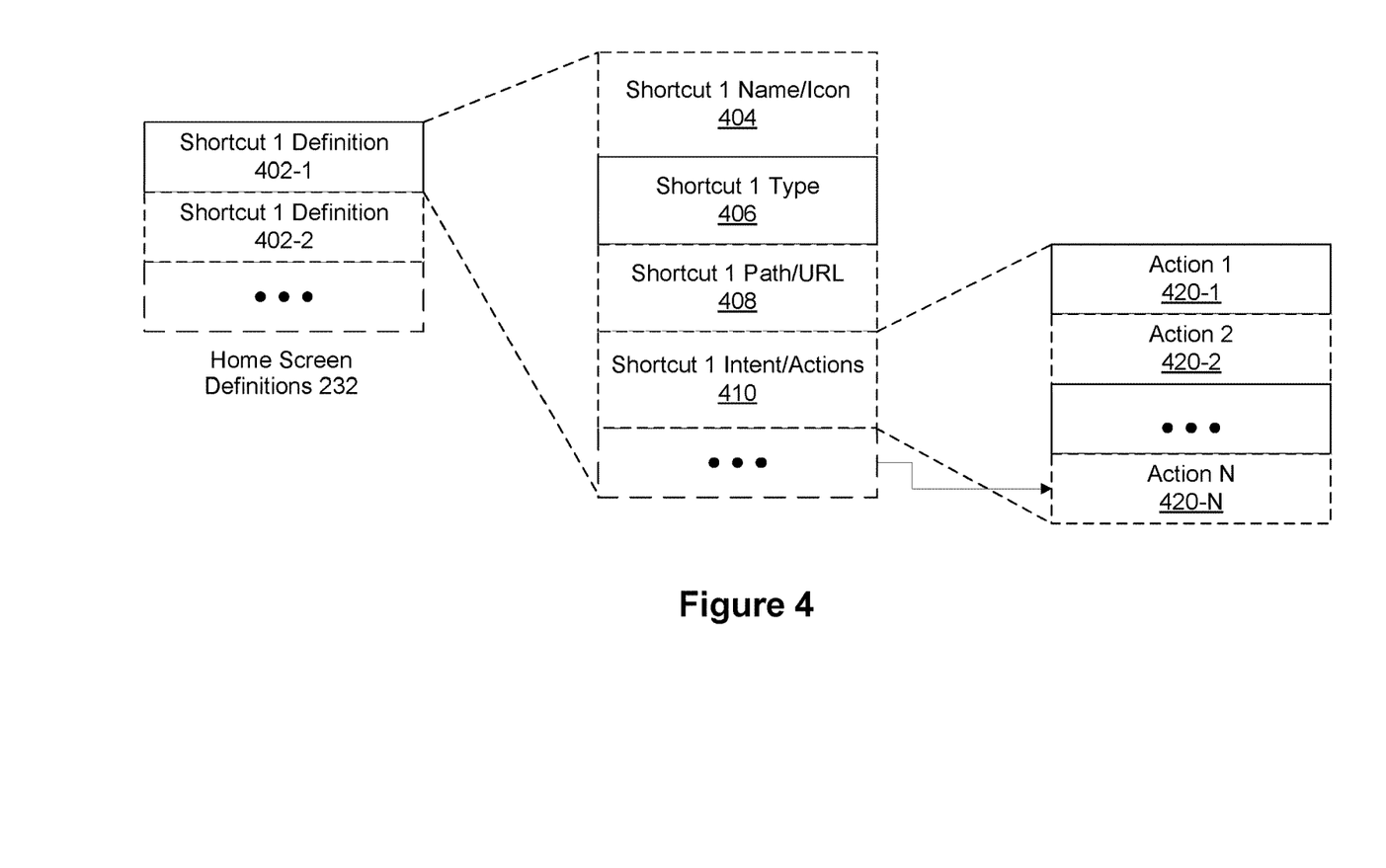
FIG. 4 is a block diagram illustrating exemplary data structures, in accordance with some embodiments.

FIG. 4 is a block diagram illustrating an exemplary data structure for the home screen definitions 232 (FIG. 2), in accordance with some embodiments. A shortcut definition 402 is associated with multiple data elements, including: a shortcut name/icon 404, a shortcut type 406, a shortcut path/URL 408 and a shortcut intent/actions 410, which further include one or more associated actions 420. The computer system 200 uses the information in the home screen definitions 232 to determine how to display the shortcuts 316 on the home screen user interface 330 and to determine which actions to take to execute a shortcut in response to selection of the associated shortcut 316.

In some embodiments, the name and/or icon displayed for a particular shortcut 316 on the home screen is derived from the name and/or icon information 404 stored for that shortcut in the home screen definitions 232. For example, for a shortcut associated with the YouTube web page, the name and icon information could be associated with an official "YouTube" icon.

In some embodiments, in response to selection of a particular shortcut 316, the associated application can be launched in accordance with the designated system path or network URL 408 stored in the home screen definitions. For example, when the shortcut is associated with a game stored locally, such as "AngryBirds," the shortcut path 408 would be directed to the location on the computer system 200 of the launcher for that game. Conversely, when the shortcut 316 is associated with a web site, the URL 408 would be directed to the URL of that website (e.g., in the case of a shortcut 316 associated with YouTube, the shortcut URL 408 would be www.youtube.com). When an intent is associated with a shortcut 316, the computer system 200 (e.g., in some embodiments, the home screen module 240) executes the actions 420 associated with the shortcut. For example, if the shortcut is associated with viewing "HBO," in pseudocode, the set of associated actions would at least in part be specified as follows:

action 420-1: launch TV Player
action 420-2: tune to HBO

In some embodiments, the shortcut type 406 provides information that enables the appropriate application to be launched in response to selection of a shortcut 316. In some embodiments, the shortcut type 406 can be selected from any application type available on the system 200. In some embodiments, the application types include: "web browser," "TV player," "email application," "game," "local application" (such as an Android application) and "widget." For example, if the shortcut type is "web browser," the system will know to launch a web browser to access the web page at the associated URL 408.

Figure 5:
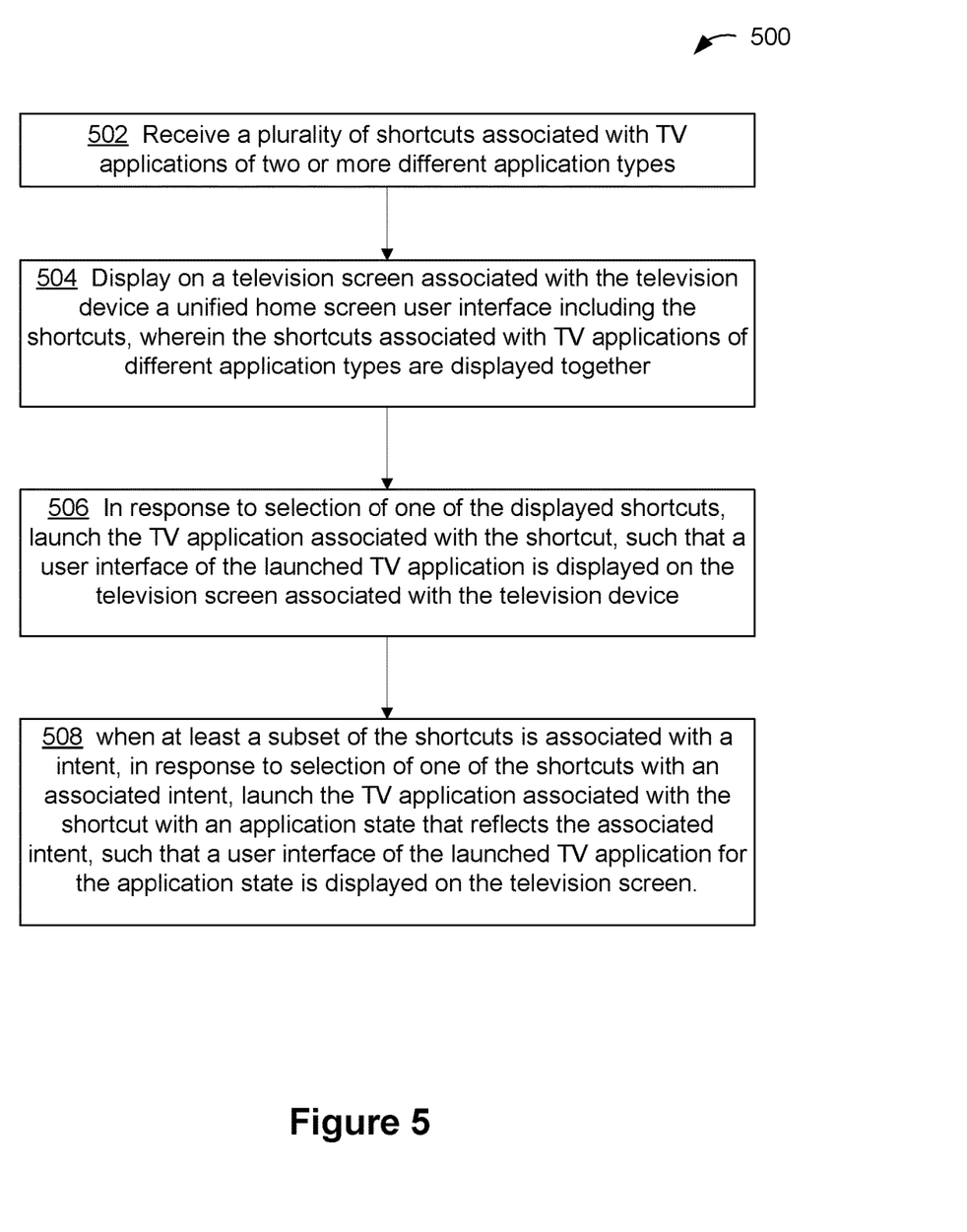
FIG. 5 is a flowchart representing a method for providing home screen shortcuts, in accordance with some embodiments.

FIG. 5 is a flowchart representing a method 500 for managing user activity data in accordance with some embodiments. The method 500 is performed at a computer system coupled with a television device. In some embodiments, the method 500 is performed by a home screen module 240 (FIG. 2). For example, the computer system may be the companion device 114 coupled with a television screen 112 or a separate television device, or the computer system may be embedded in the integrated television device 116 (FIG. 1). Alternatively, the computer system may include the personal device 118. The computer system includes one or more processors and memory storing multiple computer programs, for execution by the one or more processors, for displaying content on the television device (e.g., the media player 220, the TV player 224, or the web browser 226 (FIG. 2).

Some embodiments as shown in FIG. 5 involve a method for providing home screen short cuts to TV applications available for execution on a TV device. The method is performed at a computer system coupled with a television device and a television screen (whether integrated with the television device or not). The computer system includes one or more processors and memory storing multiple computer programs, for execution by the one or more processors, for displaying content on the television device. The method includes: receiving a plurality of shortcuts associated with TV applications of two or more different application types (502); displaying on a television screen associated with the television device a unified home screen user interface including the shortcuts (504), wherein the shortcuts associated with TV applications of different application types are displayed together; and in response to selection of one of the displayed shortcuts, launching the TV application associated with the shortcut, such that a user interface of the launched TV application is displayed on the television screen associated with the television device (506).

In some embodiments, when at least a subset of the shortcuts is associated with a intent, in which case the method includes: in response to selection of one of the shortcuts with an associated intent, launching the TV application associated with the shortcut with an application state that reflects the associated intent (508), such that a user interface of the launched TV application for the application state is displayed on the television screen.

In some embodiments, the method includes: displaying and hiding the home screen user interface under control of the TV control program based on context of the TV control program. In some embodiments, the method includes: displaying the home screen in response to selection by a user of a home screen button on a physical interface device employed by the user to control the television device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms first, second, etc. have been used herein to describe various elements, these elements should not be limited by these terms. These terms are only used to distinguish one element from another. For example, a first media player could be termed a second media player, and, similarly, a second media player could be termed a first media player. The first media player and the second media player are both media players, but they are not the same media player.

The terminology used in the description of the embodiments herein is for the purpose of describing particular embodiments only and is not intended to be limiting of the claims. As used in the description of the embodiments and the appended claims and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

What is claimed is:

1. A method, comprising:
   at a computer system coupled with a television screen, the computer system comprising one or more processors and memory:
      coupling to a plurality of media content providers and obtaining a respective media application for each of the media content providers, wherein each media application obtains media content from a respective media content provider for display on the television screen, and the plurality of media content providers includes two or more providers with different system types selected from: radio broadcasting systems, television broadcasting systems, direct satellite broadcasting systems, Internet servers and digital video recorders;
      providing content for display on the television screen from a first media content provider via a first media application;
      obtaining a plurality of shortcuts corresponding to a home screen user interface, each shortcut of the plurality of shortcuts associated with a respective media application, wherein the plurality of shortcuts includes a TV channel shortcut that, in response to selection by a user, provides for display on the television screen content currently being broadcast on the TV channel corresponding to the TV channel shortcut;
      providing the home screen user interface including the plurality of shortcuts for display concurrently with the provided content on the television screen; and
      in response to selection of one of the plurality of shortcuts displayed on the television screen, providing for display on the television screen content of a second media application corresponding to the selected displayed shortcut, wherein in response to selection of the TV channel shortcut, a set of actions are executed in association with the TV channel shortcut, the set of actions at least including a first action to launch a TV player application associated with the TV channel shortcut and a second action of tuning by the TV player application to the TV channel corresponding to the TV channel shortcut.

2. The method of claim 1, further comprising:
   displaying the content on the television screen; and
   displaying the home screen user interface at a predefined position on the television screen.

3. The method of claim 2, wherein the predefined position on the television screen is a horizontal region that coincides with a portion of the displayed content, and the home screen user interface is displayed as a horizontal overlay on the displayed content.

4. The method of claim 1, wherein the home screen user interface comprises a horizontal arrangement of the shortcuts presented in a single row.

5. The method of claim 1, further comprising:
   displaying and hiding the home screen user interface under control of a TV control program based on context of the TV control program.

6. The method of claim 1, further comprising:
   displaying the home screen user interface in response to selection by a user of a home screen button on a physical interface device employed by the user to control the television screen.

7. The method of claim 1, wherein the plurality of shortcuts is associated with a subset of the plurality of content providers that provide media content associated with a plurality of different application types, and the plurality of different application types includes two or more of: applications, TV channels, websites, games and widgets.

8. The method of claim 1, wherein one of the shortcuts is associated with a search widget, further comprising: in response to selection of the search widget, a search window is displayed allowing a user to search for media applications to assign to the home screen user interface.

9. The method of claim 1, wherein the home screen user interface is displayed on a second screen device associated with the television screen.

10. The method of claim 1, further comprising: storing the association between the shortcuts and associated media applications.

11. A computer system coupled to a television screen, the computer system comprising:
    one or more processors; and
    memory storing multiple computer programs, including a plurality of TV applications, for execution by the one or more processors and for displaying content on the television screen, the memory including instructions for:
       coupling to a plurality of media content providers and obtaining a respective media application for each of the media content providers, wherein each media application obtains media content from a respective media content provider for display on the television screen, and the plurality of media content providers includes two or more providers with different system types selected from: radio broadcasting systems, television broadcasting systems, direct satellite broadcasting systems, Internet servers and digital video recorders;
       providing content for display on the television screen from a first media content provider via a first media application;
       obtaining a plurality of shortcuts corresponding to a home screen user interface, each shortcut of the plurality of shortcuts associated with a respective media application, wherein the plurality of shortcuts includes a TV channel shortcut that, in response to selection by a user, provides for display on the television screen content currently being broadcast on the TV channel corresponding to the TV channel shortcut;
       providing the home screen user interface including the plurality of shortcuts for display concurrently with the provided content on the television screen; and
       in response to selection of one of the plurality of shortcuts displayed on the television screen, providing for display on the television screen content of a second media application corresponding to the selected displayed shortcut, wherein in response to selection of the TV channel shortcut, a set of actions are executed in association with the TV channel shortcut, the set of actions at least including a first action to launch a TV player application associated with the TV channel shortcut and a second action of tuning by the TV player application to the TV channel corresponding to the TV channel shortcut.

12. The computer system of claim 11, wherein:
    the plurality of shortcuts are selected by a user from a plurality of menus/folders of different respective application types.

13. The computer system of claim 11, wherein the home screen user interface is displayed on a second screen device associated with the television screen.

14. The computer system of claim 11, the memory further comprising the instructions for:
displaying the content on the television screen; and
displaying the home screen user interface at a predefined position on the television screen.

15. The computer system of claim 11, the memory further comprising the instructions for:
displaying and hiding the home screen user interface under control of a TV control program based on context of the TV control program.

16. A non-transitory computer readable storage medium storing multiple computer programs, including multiple TV applications, for execution by one or more processors of a computer system coupled with a television screen and for displaying content on the television screen, the non-transitory computer readable storage medium including instructions for:
coupling to a plurality of media content providers and obtaining a respective media application for each of the media content providers, wherein each media application obtains media content from a respective media content provider for display on the television screen, and the plurality of media content providers includes two or more providers with different system types selected from: radio broadcasting systems, television broadcasting systems, direct satellite broadcasting systems, Internet servers and digital video recorders;
providing content for display on the television screen from a first media content provider via a first media application;
obtaining a plurality of shortcuts corresponding to a home screen user interface, each shortcut of the plurality of shortcuts associated with a respective media application, wherein the plurality of shortcuts includes a TV channel shortcut that, in response to selection by a user, provides for display on the television screen content currently being broadcast on the TV channel corresponding to the TV channel shortcut;
providing the home screen user interface including the plurality of shortcuts for display concurrently with the provided content on the television screen; and
in response to selection of one of the plurality of shortcuts displayed on the television screen, providing for display on the television screen content of a second media application corresponding to the selected displayed shortcut, wherein in response to selection of the TV channel shortcut, a set of actions are executed in association with the TV channel shortcut, the set of actions at least including a first action to launch a TV player application associated with the TV channel shortcut and a second action of tuning by the TV player application to the TV channel corresponding to the TV channel shortcut.

17. The non-transitory computer readable storage medium of claim 16, wherein the plurality of shortcuts is associated with a subset of the plurality of content providers that provide media content associated with a plurality of different application types, and the plurality of different application types includes two or more of: applications, TV channels, websites, games and widgets.

18. The non-transitory computer readable storage medium of claim 16, wherein one of the shortcuts is associated with a search widget, further comprising: in response to selection of the search widget, a search window is displayed allowing a user to search for media applications to assign to the home screen user interface.

19. The non-transitory computer readable storage medium of claim 16, wherein the home screen user interface comprises a vertical arrangement of the shortcuts presented in a single column.

20. The non-transitory computer readable storage medium of claim 16, further comprising instructions for: storing the association between the shortcuts and associated media applications.

* * * * *